Nov. 30, 1937.                O. T. THEODORSEN                2,100,415
                              WOOD JOINING ARTICLE
                              Filed May 28, 1935
Fig.1
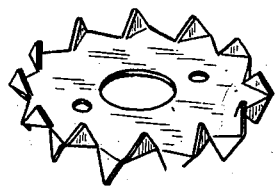
Fig.8
Fig.2
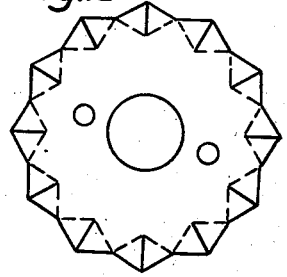
Fig.3
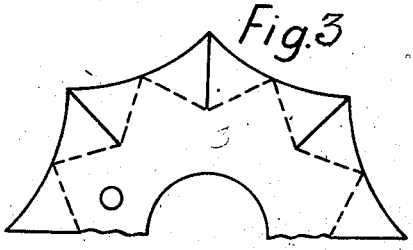
Fig.4
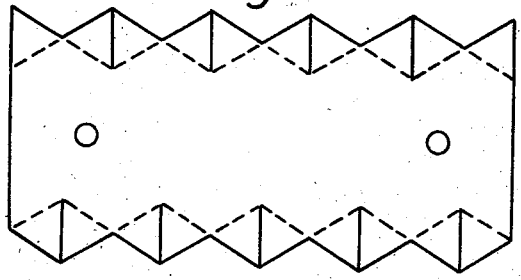
Fig.5
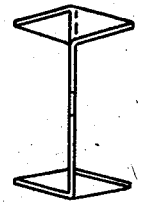
Fig.6          Fig.7
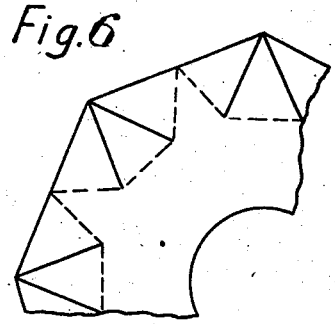 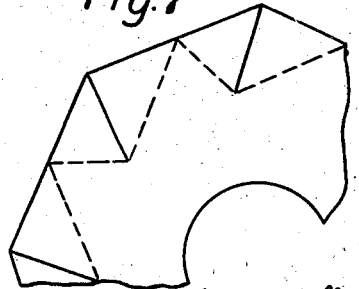
Inventor
Olav Trygve Theodorsen
By B. Singer, Atty.

Patented Nov. 30, 1937

2,100,415

UNITED STATES PATENT OFFICE 2,100,415

WOOD JOINING ARTICLE

Olav Trygve Theodorsen, Oslo, Norway

Application May 28, 1935, Serial No. 23,956
In Germany March 30, 1935

3 Claims. (Cl. 85—11)

The invention relates to joints for wood constructions in which sheet metal plates are introduced between the wooden parts, the plates being provided with teeth, bolts, screws, rivets, nails or similar fastening means being used for holding the wooden parts together.

Characterizing the invention is a peculiar arrangement of the teeth which enter into the parts to be connected. According to the invention the plates are formed in such a manner that their borders are formed as broken lines, i. e., alternately teeth and recesses or notches. Each tooth is bent out from the sheet between a notch and the border respectively between two notches.

By producing the joining article from a blank having a wavelike or zigzag shaped border angles of less than $$\frac{(n-2) \cdot 180°}{2n}$$

(in which "$n$" represents the number of sides of the blank) are obtained.

According to the invention sheets having desired tooth angles may be obtained and simultaneously the teeth may take up a non parallel position to the direction of the series of teeth. In this way there is obtained the advantage that the teeth may be more acute or more obtuse than 90° in accordance with the hardness of the wooden parts which are to be connected and simultaneously the advantage may be obtained that the teeth have suitable bearing surfaces if the direction of the force is parallel to the direction of the series of teeth. Especially is to be observed that torsion moments may also be taken up as the teeth cannot act either as a saw or as a cutting device.

The notches are arranged in the projecting parts of the border of the sheet preferably the sheet edges so that teeth having angles less than 90° may be produced.

The borders may also be formed as zigzag lines and may be provided with two or more slits projecting from the same point in several directions, more than two teeth meeting at one point before being bent out.

The sheet may have the form of a regular polygon or a star and preferably the number of sides should be divisible by four. In this way a particularly favorable form of the plate having tooth angles less than 90° and also a favorable method of production may be obtained. Further the several teeth may on the same sample have different angles and preferably greater angles on one side than on the opposite side of the sheet.

The teeth may also be bent out from the sheet with less teeth on one side than on the opposite side, whereby the sheet may be used when connecting very hard wood to softer wood.

The teeth may before the bending operation and preferably also before the slitting operation be exposed to a pressing operation for reducing the thickness of the material so that the teeth may take on the desired sharpness.

The invention is illustrated in the enclosed drawing.

Fig. 1 shows a sheet having broken borders and slits in the projecting edges.

Fig. 2 shows a sheet having the form of a regular star.

Fig. 3 shows a starshaped sheet having waved borders.

Figs. 4 and 5 show a tooth ribbon having zigzag borders forming in extended lengths which are adapted to be divided in half.

Fig. 6 shows a sheet having two slits in the same point and three teeth converging toward one point.

Fig. 7 shows a sheet having teeth provided with greater tooth angles on one side than on the opposite side.

Fig. 8 shows a portion of a sheet having teeth sharpened by reduction of the thickness of the material.

In all forms the bending lines may be direct or curved.

The sheets also may be circular, oval, polygonal or have any other form or may be produced in the form of extended ribbons.

The sheets may have bolt apertures or not. The sheets may be placed parallel to the wood fibres, or the direction of the force, at a right angle or obliquely to the same. The teeth may be bent 90° or a smaller angle out from the sheet.

The sheet may be used in wood construction of any kind, in framed buildings, dowel beams, full wall beams and the like. Two or more wooden parts may be connected. In the same sheet the teeth may have equal or different heights. Preferably acute-angled teeth are produced on square, round and oval recessed sides.

I claim:

1. A wood joining article comprising a plate in the form of a regular star and having slits extending inwardly from the points of the star and bisecting the angles thereof to provide teeth, the angles of the teeth being less than $$\frac{(n-2) \cdot 180°}{2n}$$

degrees in which $n$ represents the number of star points bent out from the plane of the plate alternately to both sides.

2. A wood joining article comprising a plate having its borders of a wavy or zig-zag form thereby to provide a series of inverted V shaped points, the plate being slit from the points inwardly to provide adjacent teeth projecting out from the plane of the plate alternately to either side.

3. A wood joining article comprising a regular polygon the sides of which are divisible by four, said plate being slit inwardly at the outer corner angles each by two slits tri-secting the point angles, the teeth being bent out from the plane of the plate alternately to either side, the number of teeth bent to one side of the plate being in excess of those bent to the other side of the plate.

OLAV TRYGVE THEODORSEN.